United States Patent

[11] 3,590,275

[72] Inventor Michael S. Fisher
Flemington, N.J.

[21] Appl. No. 766,777
[22] Filed Oct. 11, 1968
[45] Patented June 29, 1971
[73] Assignee RCA Corporation

[54] CONTROL CIRCUITS
7 Claims, 5 Drawing Figs.

[52] U.S. Cl. .......... 307/232, 307/235, 307/264, 307/252
[51] Int. Cl. .......... H03k 5/20, H03k 17/00
[50] Field of Search .......... 307/231, 232, 264, 235, 252, 106; 323/9; 330/22, 40, 136

[56] References Cited
UNITED STATES PATENTS

| | | | |
|---|---|---|---|
| 3,329,857 | 7/1967 | Hewie .......... | 302/262 |
| 3,381,226 | 4/1968 | Jones .......... | 307/252 |

*Primary Examiner*—Donald D. Forrer
*Assistant Examiner*—David M. Carter
*Attorney*—Edward J. Norton

ABSTRACT: Two transistors, connected in cascade, are arranged to prevent the appearance of an output pulse from a control circuit during positive and negative half cycles of an AC signal source, while permitting the appearance of an output pulse at the zero crossovers of the signal source.

Figure 1:
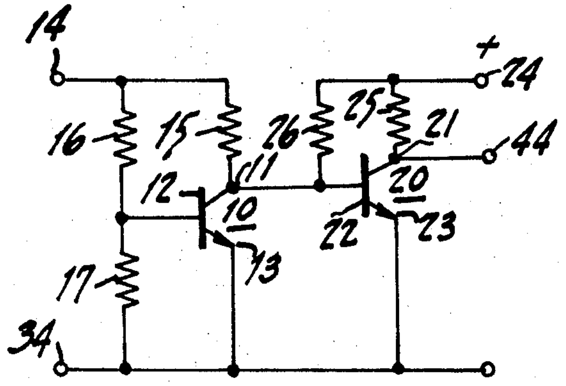

INVENTOR
Michael S. Fisher
BY Edward J Norton
ATTORNEY

INVENTOR
Michael S. Fisher
BY Edward J. Norton
ATTORNEY

CONTROL CIRCUITS

This invention relates generally to control circuits, and, more particularly to a simplified pulse generator, primarily for use within a switching circuit, for developing high current pulses at the zero crossover points of an AC line voltage.

One of the major problems frequently encountered when using alternating current control circuits is to provide a switching circuit which will turn on and off at times which correspond to minimum values of the AC power supply. A switching circuit which operates in such a manner, in addition to avoiding the generation of switching transients and the electrical interference associated therewith, can be used effectively to supply those loads having an inherent magnetic characteristic wherein it is necessary to provide only an integral number of AC cycles to assure the avoidance of saturation problems.

A further problem often encountered in the use of AC control circuits, particularly those control circuits which incorporate a thyristor element to be operated in a phase-controlled manner, is to provide a means for synchronizing the operation of a DC controlled time constant circuit with the AC supply voltage.

Accordingly, it is an object of the present invention to provide a simple, low cost pulse generator for use in synchronously switched, integral cycle control circuits.

A further object in accordance with the present invention is to provide a pulse generator for synchronizing a DC controlled time constant circuit, with the AC load current, in an AC phase-controlled circuit.

A control circuit includes first and second transistors of the same conductivity type connected in cascade circuit, said transistors having emitter, collector and base electrodes; input circuit means, adapted for connection to a signal source, for applying an AC signal to the electrodes of said first transistor to cause said first transistor to become conductive in the presence of a first half cycle of said AC signal; and second circuit means, adapted for connection to a DC potential, for applying a DC signal to the base and collector electrodes of said second transistor; said DC signal, in combination with said circuit means, adapted to keep said second transistor from becoming conductive in the presence of the remaining half cycle of said AC signal, said DC signal causing said second transistor to be switched into conduction in the absence of an applied AC signal.

Figure 2:
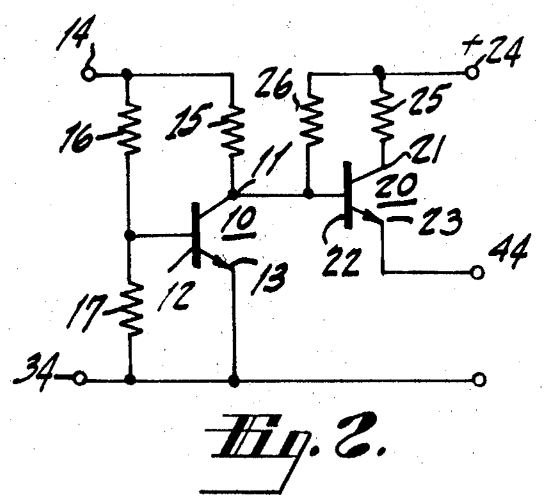
Figure 3:
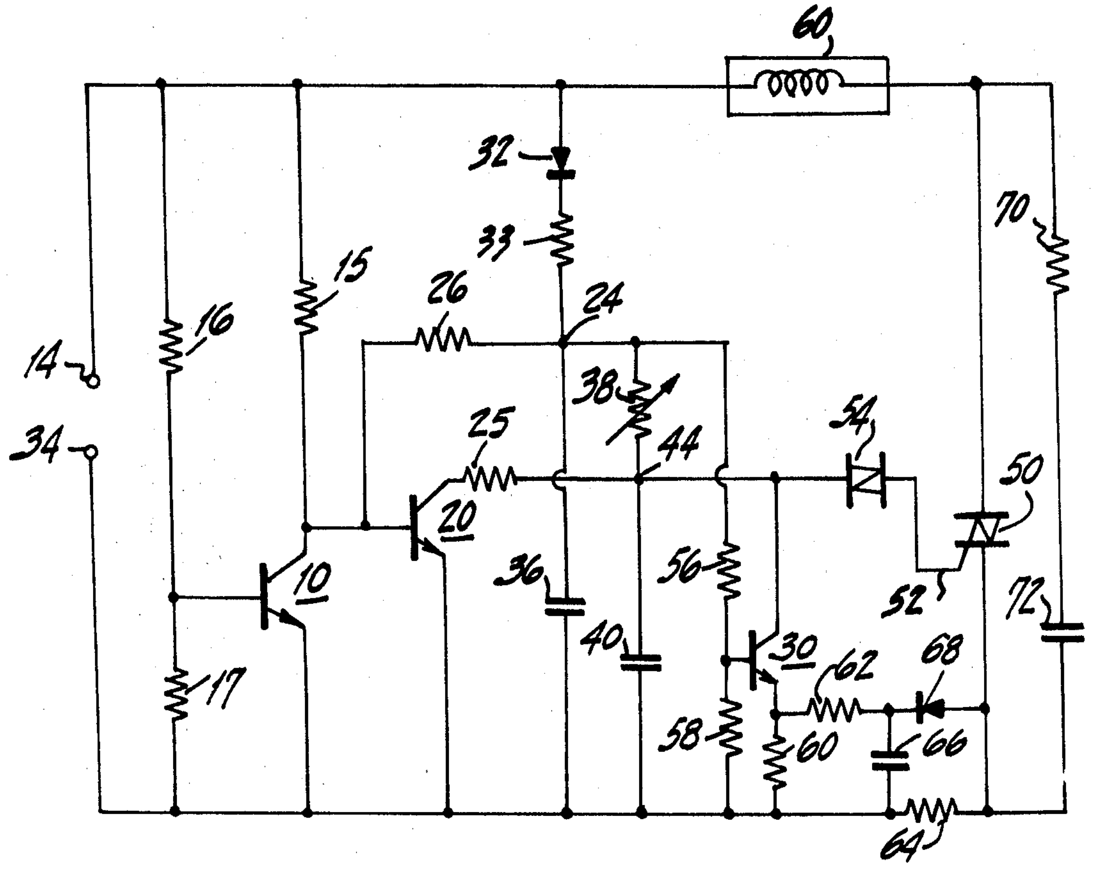
Figures 4, 5:
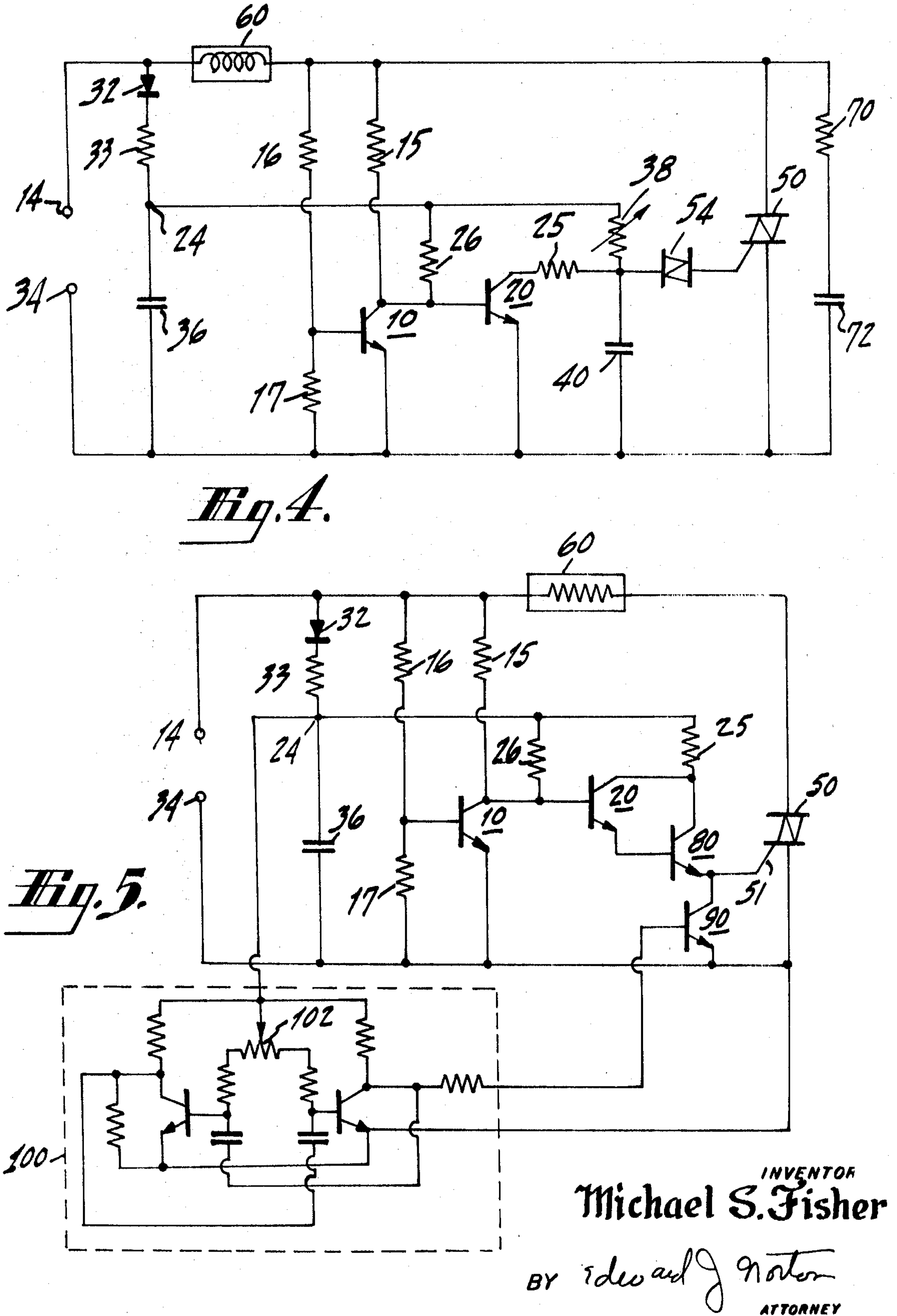

The invention itself, as well as additional objects and advantages thereof, will be best understood upon reading the following description in conjunction with the accompanying drawings, wherein like reference numerals refer to like elements, and wherein:

FIG. 1 and 2 are diagrammatic of circuits in accordance with the present invention; and FIGS. 3, 4 and 5 are illustrative of circuits which incorporate the present invention.

Turning now to a description of the present invention, as represented by FIG. 1, first and second transistors 10, 20, having emitter, collector and base electrodes, are connected in circuit, the collector 11 of the first transistor 10 being coupled to the base 22 of the second transistor 20. The collector 11 of transistor 10 is further coupled to a first terminal 14 via a first resistance 15, said first terminal 14 adapted to be coupled to a source of AC power, (not shown) hereinafter referred to as "line voltage." The base 12 of transistor 10 is connected in circuit with terminal 14 via a second resistance 16; base 12 being further connected in circuit with emitter 13 of transistor 10 via a third resistance 17. The collector 21 of transistor 20 is connected to a second terminal 24, coupled to a source of DC potential adapted to forward bias transistor 20, via a fourth resistance 25. The base 22 of transistor 20 is similarly connected in circuit with terminal 24 via a fifth resistance 26. The emitter 13 of transistor 10 and the emitter 23 of transistor 20 are coupled to a point of reference potential 34. Where the transistors are of the NPN type, as illustrated in FIG. 1, terminal 24 is connected to a point of positive DC potential.

In operation, when the line voltage causes terminal 14 to swing positive, transistor 10 is switched into a conducting state serving to effectively short circuit the emitter-to-base path of transistor 20. Alternately, when the line voltage causes terminal 14 to swing negative, transistor 20 is held off due to the current flow through resistance 15. When the potential at terminal 14 approaches zero, however, transistor 20 is switched into a conducting state as a result of the current flow through resistance 26 which tends to forward bias it. Accordingly, in FIG. 1, an output pulse is derived at terminal 44, connected to the collector 21 of transistor 20, whenever zero potential appears at terminal 14.

The circuit of FIG. 2 will operate in the same manner as that of FIG. 1. In FIG. 2, however, the output pulse is taken from the emitter 23 of transistor 20 to eliminate the presence of a DC level.

FIG. 3 illustrates one application of the present invention to phase control the firing point of a triac used to supply power to a universal motor load which incorporates a feedback signal for controlling speed regulation.

In FIG. 3, reference terminal 23 is held at a substantially constant DC level by the DC power supply composed of diode 32, resistor 33 and capacitor 36. The time constant circuit, composed of variable resistance 38 and capacitor 40 serves to provide a triggering pulse to the gate 52 of triac 50 via the triggering disc 54, as a function of the RC time constant of the circuit and the voltage level supplied there across via reference terminal 24. To coordinate the operation of the triac 50 with line voltage, it is important that the operation of the time constant circuit 38, 40 be synchronized with the line voltage so that the charging cycle of capacitor 40 is recommended every time the line voltage passes through a zero crossover. This is accomplished via the circuit of the present invention.

In operation, reference terminal 24 is held at a substantially constant DC level. Capacitor 40 charges through variable resistance 39 as a function of the DC voltage level at terminal 24. When capacitor 40 has been charged to a level which is sufficiently high to cause the potential at terminal 44 to trigger the diac 54 into conduction, triac 50 is switched into a conducting state whereby the load 60 is exposed to line voltage for the remainder of the AC half cycle. The amount of power supplied to the load 60 can be readily varied by controlling the setting of variable resistance 38 thereby changing the time constant characteristic of the RC circuit. Ideally, the foregoing process is repeated every half cycle commencing at the zero crossover of the line voltage. To insure proper operation of the circuit, however, it is important that capacitor 40 be discharged substantially to zero at the end of every half cycle so that the point at which the triac is switched into conduction relative to the phase and of the line voltage, can be maintained constant. This function is provided by transistor 20.

As previously discussed in connection with the description of FIGS. 1 and 2, transistor 20 will be switched into conduction whenever the potential at terminal 14 is reduced to zero. Therefore, in FIG. 3, whenever the line voltage passes through a zero crossover, transistor 20 will be switched into conduction and capacitor 40 discharged to zero via the collector to emitter path of the transistor.

In FIG. 3, transistor 30, resistors 56, 58, 60, 62, 64, capacitor 66, and diode 68 comprise a feedback circuit which senses the current passing through the load and compensates for any changes by altering the magnitude of current through the RC time constant circuit thereby affecting the point at which the triac is switched into conduction during subsequent half cycles. Resistor 70 and capacitor 72 comprise a commutating *dv/dt* circuit which is necessitated by the inductive characteristic of the load.

FIG. 4 is a supply circuit for an induction motor, without feedback, which incorporates the concepts of the present invention. The operation of the circuit shown in FIG. 4 is similar to that of the circuit described in FIG. 3. In FIG. 4, however, resistors 15 and 16 have been connected to the load side of the triac 50 instead of being coupled to line voltage, i.e. terminal 14, as in FIG. 3. This revised configuration offers a particular advantage when inductive loads are used since the sampling resistors 15, 16 derive their signals directly form the load. This is significant since the load current within an inductive load may lag the supply voltage considerably due to poor power factor. Therefore, by revising the circuit configuration, as shown, the discharge of capacitor 40 is linked to zero crossovers of load current rather than zero crossovers of line voltage.

FIG. 5 is illustrative of a heater controller exhibiting integral half cycle proportional control with synchronous switching. In FIG. 5 transistor 20 delivers high current pulses to the gate 51 to the triac 50, via transistor 80, in synchronism with the zero crossovers of line voltage. Transistor 90 serves to divert these triggering pulses from the gate 51 of triac 50 whenever it, i.e. transistor 90, is in saturation. The conduction of transistor 90 is determined by the duty factor of the output pulse of the multivibrator circuit 100. By varying the duty factor of the output pulse of the multivibrator circuit 100, i.e. via its potentiometer 102, the number of half cycles for which the triac 50 will conduct may be varied. It should be noted that in the circuit of FIG. 5, the triac 50 will only be switched into conduction at the beginning of any AC half cycle when transistor 90 is not conducting; it will remain conducting till the end of the next half cycle just after the time transistor 90 is switched into saturation.

What I claim is:

1. In combination:

first and second transistors of the same conductivity type connected in cascade circuit, said transistors having emitter, collector and base electrodes, input circuit means, adapted for connection to a signal source, for applying an AC signal to the electrodes of said first transistor to cause said first transistor to become conductive only during a half cycle of one polarity of said AC signal, said second transistor being rendered nonconductive in response to said first transistor being rendered conductive; and bias means for applying a DC signal to the base and collector electrodes of said second transistor, said bias means cooperating with said input circuit means to keep said second transistor from becoming conductive in the presence of the remaining half cycle of said AC signal, said DC signal causing said second transistor to be momentarily switched into conduction during the zero crossovers of the applied AC signal.

2. In combination:

first and second transistors of the same conductivity type, said transistors having emitter, collector and base electrodes;

the collector of said first transistor connected to the base of said second transistor;

the emitter of said first transistor connected to the emitter of said second transistor;

input circuit means for providing an AC signal to the electrodes of said first transistor to cause said first transistor to become conductive only during a half cycle of one polarity of said AC signal; and bias means for providing a DC potential to the base and collector electrodes of said second transistor, the polarity of said DC potential being appropriate to forward bias said second transistor to cause said second transistor to conduct only at the zero crossovers of said AC signal.

3. In combination:

first and second transistors having emitter, collector and base electrodes, the collector of said first transistor coupled to the base of said second transistor;

input circuit means connecting said first transistor to a signal source for applying an AC signal to the electrodes of said first transistor to cause it to become conductive only during a half cycle of one polarity of said AC signal and thereby said second transistor to become nonconductive; and second circuit means connecting said second transistor to a DC potential, said second circuit means cooperating with said first circuit means to keep said second transistor from becoming conductive in the presence of the remaining half cycle of said AC signal and causing said second transistor to become conductive only during the zero crossovers of the applied AC signal.

4. A control circuit comprising:

first and second transistors having emitter, collector and base electrodes, the collector of said first transistor coupled to the base of said second transistor;

first and second input terminals adapted for connection to an AC signal source, the emitters of said first and second transistors coupled to said second input terminal;

a third input terminal adapted for connection to a DC signal source;

a first resistance connected between said first input terminal and the base of said first transistor;

a second resistance connected between said first input terminal and the collector of said first transistor;

a third resistance connected between the base and emitter electrodes of said first transistor, the values of said first, second and third resistances being selected to render said first transistor conductive only during a half cycle of one polarity of the AC signal;

a fourth resistance connected between said third input terminal and the base of said second transistor; and a fifth resistance connected between said third input terminal and the collector of said second transistor;

said DC signal having a polarity and the values of said fourth and fifth resistances being selected to cause said second transistor to be momentarily switched into conduction during the zero crossovers of the AC signal at said first and second input terminals.

5. A control circuit comprising:

first and second transistors having emitter, collector and base electrodes;

the collector of said first transistor coupled to the base of said second transistor;

first and second input terminals adapted for connection to an AC signal source;

a first resistance connected between the base of said first transistor and said first input terminal;

a second resistance connected between the collector of said first transistor and said first input terminal;

a third resistance connected between the base of said first transistor and said second input terminal, the values of said first, second and third resistances being selected to render said first transistor conductive only during a half cycle of one polarity of the AC signal:

the emitter of said first transistor being coupled to said second input terminal;

a fourth resistance connected between the base of said second transistor and a point of DC potential; and a fifth resistance connected between the collector of said second transistor and said point of DC potential;

the values of said fourth and fifth resistance being selected such that in cooperation with said DC potential said second transistor is switched into conduction during the zero crossovers of the AC signal at said first and second input terminals to produce an output pulse at the emitter electrode of said second transistor.

6. A control circuit as defined in claim 5 wherein said first and second transistors are of the same conductivity type.

7. A control circuit as defined in claim 4 wherein said first and second transistors are of the same conductivity type.

UNITED STATES PATENT OFFICE

CERTIFICATE OF CORRECTION

Patent No. 3,590,275 Dated June 29, 1971

Inventor(s) Michael S. Fisher

It is certified that error appears in the above-identified patent and that said Letters Patent are hereby corrected as shown below:

Column 2, line 24 "terminal 23" should read --terminal 24--

Column 2, line 29 "disc" should read --diac--

Column 2, line 34 "recommended" should read --recommenced--

Column 2, line 39 "39" should read --38--

Column 2, line 54 "and" should read --angle--

References Cited - "3,329,857" should read-3,329,837-

References Cited - "302/262" should read --307/262--

Signed and sealed this 7th day of March 1972.

(SEAL)
Attest:

EDWARD M.FLETCHER,JR.
Attesting Officer

ROBERT GOTTSCHALK
Commissioner of Patents